(No Model.)
W. H. KEEP.
BOILER TUBE CLEANER.
No. 343,998. Patented June 22, 1886.
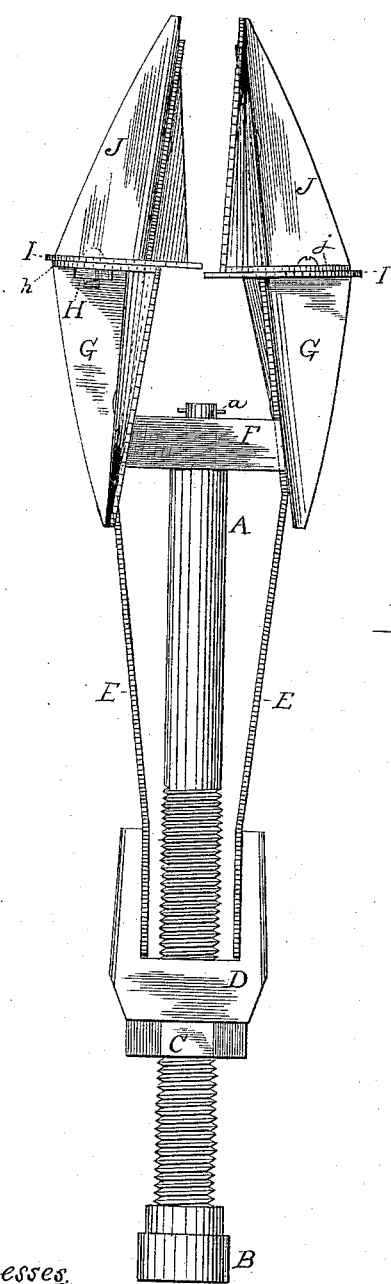
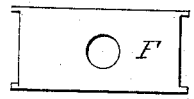
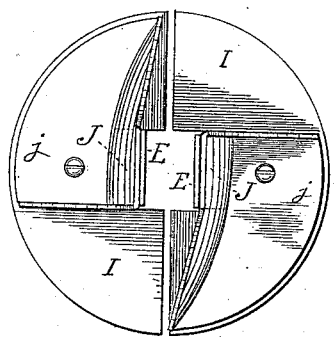
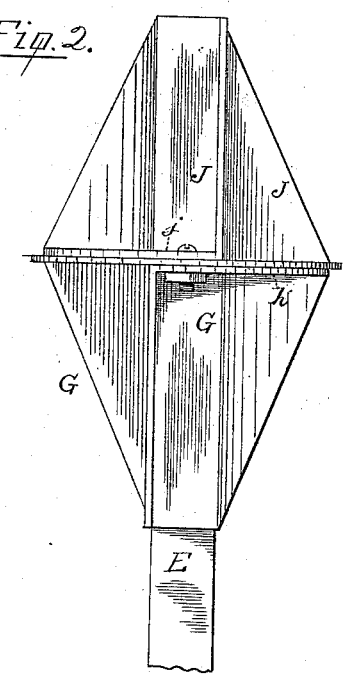
Witnesses.
Elihu P. Stowe
Alfred B. Treadwell
Inventor.
William H. Keep
By Joshua B. Webster Atty.

UNITED STATES PATENT OFFICE.

WILLIAM H. KEEP, OF STOCKTON, CALIFORNIA.

BOILER-TUBE CLEANER.

SPECIFICATION forming part of Letters Patent No. 343,998, dated June 22, 1886.

Application filed October 26, 1885. Serial No. 181,038. (No model.)

*To all whom it may concern:*

Be it known that I, WILLIAM H. KEEP, a citizen of the United States, residing at Stockton, in the county of San Joaquin and State of California, have invented certain new and useful Improvements in Boiler-Tube Cleaners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a mechanism for cleaning out the tubes or flues of steam-boilers which shall be convenient, durable, and efficient, and which can be entered into the tube with facility and adapted to fit exactly the size of the tube, and when turned therein to thoroughly scrape off any incrustations. I attain this object by mechanism constructed as shown in the accompanying drawing and hereinafter described.

In the drawings, Figure 1 is an elevation. Fig. 2 is a view of the head of the cleaner at right angles to Fig. 1. Fig. 3 is an end view. Fig. 4 is a detached view of the spreader.

A denotes the round stem of the instrument, the lower half of which is furnished with male threads, and at its lower end is screwed into the upper end of a coupling, B, to the lower end of which may be screwed the handling-rod. Just above the coupling B is a nut, C, and above it a bifurcated nut, D, both nuts being provided with female threads and turning upon the threaded portion of stem A. The head of the stem has a neck upon which is placed a spreader, F, secured in its position by a pin, *a*, at the top of the neck. Spreading jaws E are riveted to the bifurcations of nut D and encompass spreader F. To the top of each jaw is riveted a right-angle vertical scraper-guide, G, having a head, *h*, and above it is a similar scraper-guide, J, having a base, *j*. Between the parts *h* and *j* is a horizontal half-circular flange, I, the two half-circles forming one flange having a slot in their center and permitting the passage of the spreader F. The four scraper-guides J and G form a cone.

In using the cleaner it is forced into the flue and passed from one end to the other in the ordinary manner. The spring-jaws E spread by the action of the bifurcated nut D turning on the thread of the stem A, and, forcing the spreader F upwardly between the sections of the scraper-guides, and opens them out to fit the size of the flue. The nut C is screwed against the nut D to insure rigidity of position when the scrapers have been adjusted, as above described, to the size of the flue. The sections I of the flange and the sections J and G of the scraper-guide being connected together by the bolt H, by its removal the flange-section may be easily removed and replaced. The edges of the sections of the flange I coming in close contact with the surface of the boiler-flues and being moved back and forth thoroughly cleanse them from all rust and incrustations.

Having thus described my invention, what I claim as new, and desire to secure by Letters Patent, is—

The combination, with the stem A, provided with threads, of the coupling B, the nut C, the bifurcated nut D, the spreader F, and the pin *a*, the nut D being provided with the spring-jaws E, embracing the spreader F, and having attached at their heads the lower scrapers, G, having the heads *h*, and the upper scrapers, J, having the bases *j*, said scrapers being also secured by bolts H to the flange-sections I, having a center slot, permitting the passage of the spreader F, all constructed and arranged as and for the purposes set forth.

In testimony whereof I affix my signature in presence of two witnesses.

WILLIAM H. KEEP.

Witnesses:
JOSHUA B. WEBSTER,
ELIHU B. STOWE.